(12) United States Patent
Choi

(10) Patent No.: US 9,995,214 B2
(45) Date of Patent: Jun. 12, 2018

(54) VARIABLE COMPRESSION RATIO DEVICE

(71) Applicant: HYUNDAI MOTOR COMPANY, Seoul (KR)

(72) Inventor: Myungsik Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/233,339

(22) Filed: Aug. 10, 2016

(65) Prior Publication Data
US 2017/0167369 A1 Jun. 15, 2017

(30) Foreign Application Priority Data
Dec. 11, 2015 (KR) .................. 10-2015-0177014

(51) Int. Cl.
*F02B 75/04* (2006.01)
*F02D 15/02* (2006.01)

(52) U.S. Cl.
CPC .......... *F02B 75/048* (2013.01); *F02B 75/045* (2013.01); *F02D 15/02* (2013.01)

(58) Field of Classification Search
CPC ........ F02B 75/045; F02B 75/048; F16C 7/06; F16C 23/10; F02D 15/02
USPC ....................................................... 123/48 B
See application file for complete search history.

(56) References Cited

U.S. PATENT DOCUMENTS

| 5,562,068 A * | 10/1996 | Sugimoto | F02B 75/045 123/197.4 |
| 6,622,669 B1 * | 9/2003 | Nageswar Rao | F02B 75/045 123/48 B |
| 6,705,255 B2 * | 3/2004 | Papaioannou | F02B 75/04 123/48 R |
| 9,574,495 B2 * | 2/2017 | Matsuda | F02B 75/045 |
| 2013/0247879 A1 * | 9/2013 | von Mayenburg | F02B 75/045 123/48 B |

FOREIGN PATENT DOCUMENTS

| JP | 2015-124635 A | 7/2015 |
| KR | 10-1028181 B1 | 4/2011 |
| KR | 10-2011-0062143 A | 6/2011 |
| KR | 10-2012-0010881 A | 2/2012 |
| KR | 10-1510321 B1 | 4/2015 |

* cited by examiner

*Primary Examiner* — Marguerite McMahon
*Assistant Examiner* — James Kim
(74) *Attorney, Agent, or Firm* — McDermott Will & Emery LLP

(57) ABSTRACT

A variable compression ratio device mounted to an engine, the engine rotating a crankshaft using a combustion force of a gas mixture and a piston, the variable compression ratio device changing a compression ratio of the mixture and including a connecting rod including a small end rotatably connected to the piston and a big end portion formed with a circular hole to be eccentrically rotatably connected to the crankshaft, a crank pin provided in the crankshaft, an eccentric cam provided to be concentrically rotatable in the hole of the big end portion and having a crank pin mounting hole eccentrically inserted with the crank pin to be rotatably connected, and a cam rotation unit provided inside the eccentric cam and rotating the eccentric cam in a clockwise or counterclockwise direction in a hole of the big end portion by a selectively supplied hydraulic pressure.

9 Claims, 7 Drawing Sheets

VARIABLE COMPRESSION RATIO DEVICE

CROSS-REFERENCE TO RELATED APPLICATION

This application claims the benefit of priority to Korean Patent Application No. 10-2015-0177014, filed in the Korean Intellectual Property Office on Dec. 11, 2015, the entire contents of which are incorporated herein by reference.

TECHNICAL FIELD

The present disclosure relates to a variable compression ratio device. More particularly, the present disclosure relates to a variable compression ratio device for varying a compression ratio by changing a volume of a combustion chamber.

BACKGROUND

In general, thermal efficiency of a heat engine increases as a compression ratio becomes higher. Here, the compression ratio refers to a ratio of a volume of air which is compressed in a cylinder by a piston. That is, if a volume of a combustion chamber is changed, the compression ratio may be changed.

By changing the compression ratio in accordance with an operational state of an engine, fuel efficiency may be improved in a low load condition of the engine by raising the compression ratio of an fuel-air mixture, and the occurrence of knocking may be prevented and engine output may be improved in a high load condition of the engine by lowering the compression ratio of the fuel-air mixture.

In the related art, a variable compression ratio (VCR) apparatus, which changes the compression ratio by changing a top dead center of the piston, has been used.

However, the variable compression ratio apparatus of the related art requires a power source such as a plurality of links, and a motor to change the top dead center of the piston. Therefore, a weight of the engine is increased due to weight of the links and the motor, and a complicated design is required to prevent interference of the plurality of links. In addition, in a case in which it is not easy to change a volume of compressed air, it may be difficult to change the compression ratio.

The above information disclosed in this Background section is only for enhancement of understanding of the background of the disclosure and therefore it may contain information that does not form the prior art that is already known in this country to a person of ordinary skill in the art.

SUMMARY

The present disclosure provides a variable compression ratio device varying a compression ratio of a fuel-air mixture by being equipped with an eccentric cam on a big end portion of a connecting rod and rotating the eccentric cam by using a supplied hydraulic pressure.

An aspect of the present disclosure may include a variable compression ratio device mounted to an engine, the engine rotating a crankshaft using a combustion force of a gas mixture and a piston, the variable compression ratio device changing a compression ratio of the mixture and may include: a connecting rod including a small end rotatably connected to the piston and a big end portion formed with a circular hole to be eccentrically rotatably connected to the crankshaft; a crank pin provided in the crankshaft; an eccentric cam provided to be concentrically rotatable in the hole of the big end portion and having a crank pin mounting hole eccentrically inserted with the crank pin to be rotatably connected; and a cam rotation unit provided inside the eccentric cam and rotating the eccentric cam in a clockwise or counterclockwise direction in a hole of the big end portion by a selectively supplied hydraulic pressure.

The cam rotation unit may include a diaphragm formed toward a center of the eccentric cam from an exterior circumference of the eccentric cam; a first chamber formed at one side of the diaphragm in the circumferential direction inside the eccentric cam based on the diaphragm; a second chamber formed at another side of the diaphragm in the circumferential direction inside the eccentric cam based on the diaphragm; a first oil passage connecting the interior circumference of the crank pin mounting hole and the first chamber and selectively supplying a hydraulic pressure to the first chamber; and a second oil passage connecting the interior circumference of the crank pin mounting hole and the second chamber and selectively supplying the hydraulic pressure to the second chamber.

The first chamber and the second chamber may be formed to be rounded in the circumferential direction of the eccentric cam at both sides of the diaphragm.

The first oil passage may be formed through the eccentric cam such that one end of the first oil passage is connected to the interior circumference of the crank pin mounting hole and the other end is connected to the first chamber.

The second oil passage may be formed through the eccentric cam such that one end is connected to the interior circumference of the crank pin mounting hole and the other end is connected to the second chamber, and is positioned to be separated from the first oil passage.

The eccentric cam may be rotated by the hydraulic pressure that selectively inflows to the first chamber and the second chamber depending on a driving condition of the engine and may vary the relative position of the crank pin to the big end portion.

The eccentric cam may rotate the crank pin mounting hole in the counterclockwise direction when the hydraulic pressure is supplied to the first chamber such that the relative position of the crank pin center to the eccentric cam center is lowered.

The eccentric cam may rotate the crank pin mounting hole in the clockwise direction when the hydraulic pressure is supplied to the second chamber such that the relative position of the crank pin center to the eccentric cam center is higher.

The diaphragm may be fixed to the interior circumference of the big end portion through an upper surface.

The diaphragm may divide the first and second chambers to selectively supply the hydraulic pressure to the first chamber or the second chamber.

According to the variable compression ratio device according to an exemplary embodiment of the present disclosure, the eccentric cam may be mounted on the big end portion of the connecting rod and the hydraulic pressure may be selectively supplied to the eccentric cam depending on the operation state of the engine to change the compression ratio of the mixture, thereby improving the fuel consumption.

Also, compared with the variable compression ratio device of a conventional link type, the structure is simpler, the weight is reduced, and the frictional forces according to the operation are reduced such that the durability may be improved.

Also, by using the connecting rod and the crankshaft that are applicable to the conventional engine, the variable compression ratio device may be mounted while minimizing structural changes of the conventional engine.

DETAILED DESCRIPTION

Figure 1:
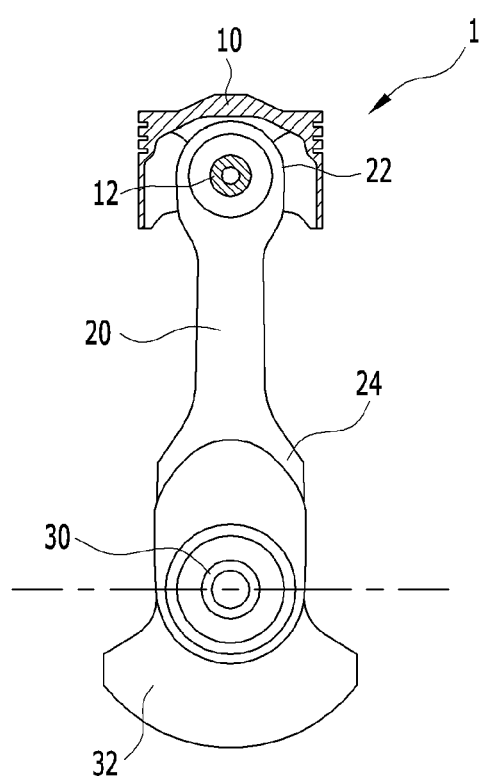
FIG. 1 is a schematic diagram of a variable compression ratio device according to an exemplary embodiment of the present disclosure.

An exemplary embodiment of the present disclosure will hereinafter be described in detail with reference to the accompanying drawings.

Exemplary embodiments described in this specification and drawings are merely exemplary embodiments of the present disclosure. It is to be understood that there may be various modifications and equivalents included in the spirit of the present disclosure.

The drawings and description are to be regarded as illustrative in nature, and not restrictive. Like reference numerals designate like elements throughout the specification.

Further, in the drawings, a size and thickness of each element may be represented for better understanding and ease of description, and the present disclosure is not limited thereto and the thickness of layers, films, panels, regions, etc., may be exaggerated for clarity.

In addition, throughout the specification, unless explicitly described to the contrary, the word "comprise" and variations such as "comprises" or "comprising", will be understood to imply the inclusion of stated elements but not the exclusion of any other elements.

In addition, the terms " . . . unit", " . . . means", " . . . part", and " . . . member" described in the specification mean units of a general configuration performing at least one function or operation.

Figure 2:
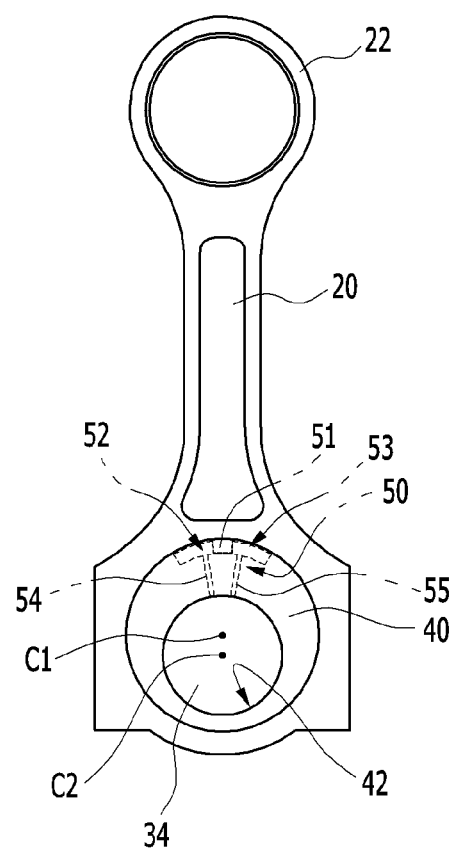
FIG. 2 is a front view of a connecting rod applied to a variable compression ratio device according to an exemplary embodiment of the present disclosure.
Figure 3:
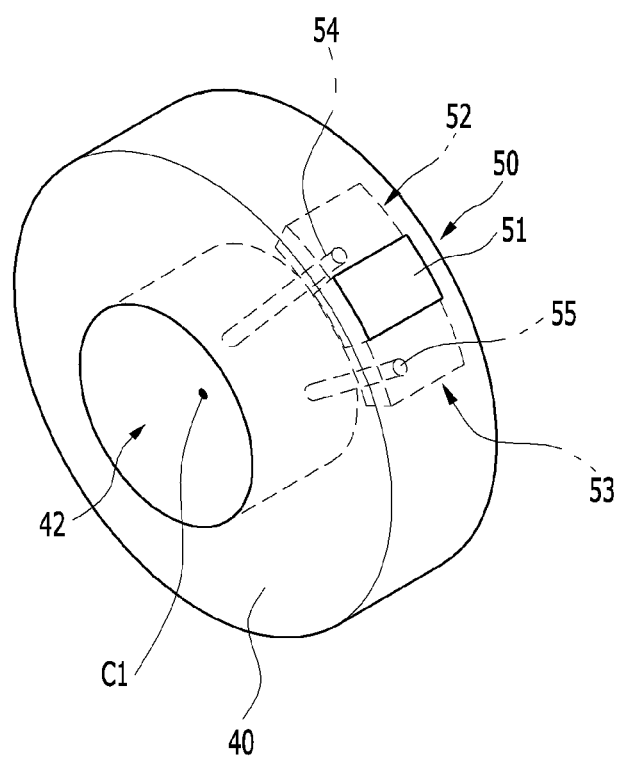
FIG. 3 is a perspective view of an eccentric cam of a variable compression ratio device according to an exemplary embodiment of the present disclosure.

FIG. 1 is a schematic diagram of a variable compression ratio device according to an exemplary embodiment of the present disclosure, FIG. 2 is a front view of a connecting rod applied to a variable compression ratio device according to an exemplary embodiment of the present disclosure, and FIG. 3 is a projected perspective view of an eccentric cam of a variable compression ratio device according to an exemplary embodiment of the present disclosure.

FIG. 1 illustrates a cross section of a piston 10 for representing a configuration of a variable compression ratio apparatus 100. That is, the illustration of the piston 10 based on the cross section is for easily representing a configuration of a connection of the variable compression ratio apparatus 100 inside the piston 10.

As illustrated in FIG. 1, the variable compression ratio device 1 according to the exemplary embodiment of the present disclosure is mounted in an engine (not illustrated) for rotating a crank shaft 30 by receiving a combustion force of an exploded gas mixture from the piston 10, and changes a mixing ratio according to an operation condition of the engine The piston 10 vertically moves inside a cylinder (not illustrated), and a combustion chamber is formed between the piston 10 and the cylinder.

The crankshaft 30 may receive the combustion force from the piston 10, convert the transmitted combustion force into torque, and transmit the torque to a transmission (not illustrated). The crankshaft 30 may be mounted inside a crank case (not illustrated) formed at a lower end of the cylinder. Further, a plurality of balance weights 32, or counterweights, is mounted in the crank shaft 30. The balance weight 32 may decrease a vibration generated during a rotation of the crank shaft 30.

The configuration of the engine including the piston 10 and the crank shaft 30 may be obvious to a person of ordinary skill in the art, and a more detailed description will be omitted.

The variable compression ratio device 1 according to an exemplary embodiment of the present disclosure may include a connecting rod 20, a crank pin 34, an eccentric cam 40 and a cam rotation unit 50.

The connecting rod 20 may receive the combustion force from the piston 10 to be transmitted to the crankshaft 30. In order to transmit the combustion force, one end of the connecting rod 20 may be rotatably connected to the piston 10 by a piston pin 12, and the other end of the connecting rod 20 may be rotatably connected to the crankshaft 30.

Further, the other end of the connecting rod 20 may be eccentrically connected to one side of the crankshaft 30. In general, the one end portion of the connecting rod 20 connected with the piston 10 may be referred to as a small end portion 22, and the other end portion of the connecting rod 20 connected with the crankshaft 30 may be referred to as a big end portion 24.

That is, the connecting rod 20 may include the small end portion 22 connected rotatably to the piston 10 and the big end portion 24 formed with a hole of a circular shape to be eccentrically and rotatably connected to the crankshaft 30.

The entire shape of the connecting rod 20 having the above-described configuration may be similar to a conventional connecting rod. Accordingly, the variable compression ratio device 1 may be realized while minimizing a structural change of the conventional engine.

The crank pin 34 may be provided in the crankshaft 30. The eccentric cam 40 may include a crank pin mounting hole 42. The crank pin mounting hole 42 may be eccentrically formed in the eccentric cam 40. Also, the crank pin 34 may be inserted to the crank pin mounting hole 42 such that the connecting rod 20 and the eccentric cam 40 are connected to the crankshaft 30 to be rotatable relatively. That is, the eccentric cam 40 may be provided in the hole formed in the big end portion 24 of the connecting rod 20 to be concentrically rotatable, thereby being rotated around the center of the crank pin 34.

Also, the crank pin 34 may be inserted to the eccentric cam 40 to be eccentric to the crank pin mounting hole 42 to be rotatably connected.

Accordingly, a center C2 of the crank pin 34 may be separated from a center C2 of the eccentric cam 40 by a predetermined distance.

Here, if the eccentric cam 40 is rotated, the relative position of the crank pin 45 for the center C1 of the eccentric cam 40 may be changed. That is, the relative position of the connecting rod 20 and the piston 10 for the crankshaft 30 may be changed. Accordingly, the compression ratio of the mixture may be changed.

Figure 4A:
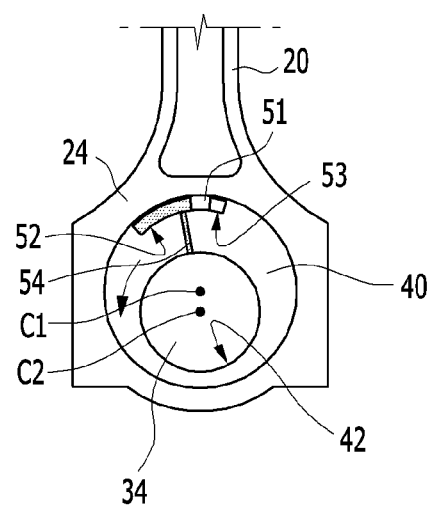
FIGS. 4A and 4B are operation diagrams of a cam rotation unit applied to a variable compression ratio device according to an exemplary embodiment of the present disclosure.
Figure 4B:
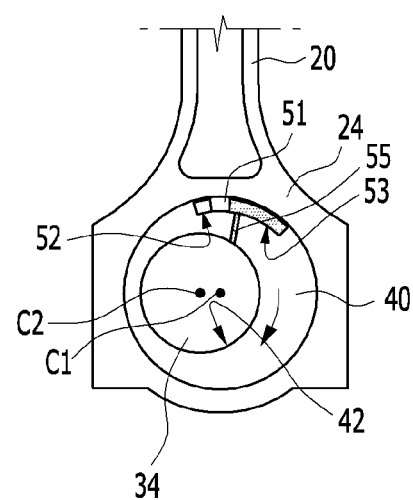

Also, the cam rotation unit 50 may be provided inside the eccentric cam 40 and rotate the eccentric cam 40 by the selectively supplied hydraulic pressure in the hole of the big end portion 24 in a clockwise, or first direction from the perspective as shown in FIG. 4B, or a counterclockwise, or second, direction, from the perspective as shown in FIG. 4A The cam rotation unit 50, as shown in FIG. 3, may include a diaphragm 51, a first chamber 52, a second chamber 53, a first oil passage 54 and a second oil passage 55.

The diaphragm 51 may be formed toward the center of the eccentric cam 40 from an exterior circumference of the eccentric cam 40. Here, the diaphragm 51 may be fixed to an interior circumference of the big end portion 24 through an upper surface.

The first chamber 52 may be formed at one side based on the diaphragm 51 in a circumferential direction, or arrangement, inside the eccentric cam 40. The hydraulic pressure may be selectively supplied inside the first chamber 52.

Also, the second chamber 53 may be formed at another side based on the diaphragm 51 in the circumferential direction, or arrangement, inside the eccentric cam 40. The hydraulic pressure may be selectively supplied inside the second chamber 53.

Accordingly, the first chamber 52 and the second chamber 53 may be formed to be rounded in the circumferential direction, or arrangement, of the eccentric cam 40 at both sides of the diaphragm 51.

Here, the diaphragm 51 may divide the first and second chambers 52 and 53 to selectively supply the hydraulic pressure to the first chamber 52 or the second chamber 53.

Accordingly, if the hydraulic pressure is supplied to the first chamber 52, the eccentric cam 40 may be rotated in the clockwise, or first, direction with respect to the diaphragm 51 fixed to the hole of the big end portion 24, and the second chamber 53 may be moved toward the diaphragm 51.

In contrast, if the hydraulic pressure is supplied to the second chamber 53, the eccentric cam 40 may be rotated in the counterclockwise, or second, direction with respect to the diaphragm 51 fixed to the hole of the big end portion 24, and the first chamber 52 may be moved toward the diaphragm 51.

The first oil passage 54 may connect the interior circumference of the crank pin mounting hole 42 and the first chamber 52 and selectively supply the hydraulic pressure to the first chamber 52.

Also, the second oil passage 55 may connect the interior circumference of the crank pin mounting hole 42 and the second chamber 53 and selectively supply the hydraulic pressure to the second chamber 53.

Here, the first oil passage 54 may be formed through the inside of the eccentric cam 40 such that one end of the first oil passage 54 is connected to the interior circumference of the crank pin mounting hole 42 and another end thereof is connected to the first chamber 52.

Also, the second oil passage 55 may be formed through the inside of the eccentric cam 40 such that one end thereof is connected to the interior circumference of the crank pin mounting hole 42 and another end thereof is connected to the second chamber 53, and the second oil passage 55 may be positioned to be separated from the first oil passage 54.

Accordingly, the eccentric cam 40 may be rotated by the hydraulic pressure that selectively inflows to the first chamber 52 and the second chamber 53 depending on a driving condition of the engine, and a relative position of the crank pin 34 for the big end portion 24 may be varied.

That is, the cam rotation unit 50 may vary the relative position of the center C2 of the crank pin 34 to the center C1 of the eccentric cam 40 by using the hydraulic pressure that is selectively supplied to the first chamber 52 or the second chamber 53 depending on the driving condition of the engine to vary the compression ratio of the engine.

On the other hand, in an exemplary embodiment, a separate oil supply passage connected to a journal formed in the crankshaft 30 is connected to at least one spool valve and an oil control valve such that the cam rotation unit 50 may be supplied with the oil stored in an oil pan.

Next, an operation and an action of the variable compression ratio device 1 according to an exemplary embodiment of the present disclosure will be described.

FIGS. 4A and 4B are operation diagrams of a cam rotation unit applied to a variable compression ratio device according to an exemplary embodiment of the present disclosure.

As shown in FIG. 4A, in a condition where the engine is operated with a high compression ratio, the hydraulic pressure inflows to the first chamber 52 through the first oil passage 54. Thus, the eccentric cam 40 may be rotated in a counterclockwise, or second, direction with respect to the diaphragm 51 by the hydraulic pressure supplied to the first chamber 52. In this case, the second chamber 53 may be moved toward the diaphragm 51.

That is, when the hydraulic pressure is supplied to the first chamber 52, the eccentric cam 40 may rotate the crank pin mounting hole 42 in a counterclockwise, or second, direction to decrease the relative position of the center C2 of the crank pin 34 and the center C1 of the eccentric cam 40.

Accordingly, the relative position of the center C2 of the crank pin 34 to the center C1 of the eccentric cam 40 is lowered, as shown in FIG. 4B. In this case, since the actual position of the crankshaft 30 and the crank pin 34 is not changed, the relative position of the connecting rod 20 and the piston 10 to the crankshaft 30 may be higher than in the state shown in FIG. 4B at an upper changeover point. Accordingly, a distance between the piston pin 12 and the crank pin 34 may increase such that the high compression ratio of the engine is realized.

As shown in FIG. 4B, in a condition where the engine is operated with a low compression ratio, the hydraulic pressure inflows to the second chamber 53 through the second oil passage 55. Thus, the eccentric cam 40 may be rotated in the clockwise, first, direction with respect to the diaphragm 51 by the hydraulic pressure supplied to the second chamber 53. In this case, the first chamber 52 may be moved toward the diaphragm 51.

That is, when the hydraulic pressure is supplied to the second chamber 53, the eccentric cam 40 may rotate the crank pin mounting hole 42 in the clockwise, or second, direction such that the relative position of the center C2 of the crank pin 34 to the center C1 of the eccentric cam 40 is higher relative to the position shown in FIG. 4A.

Accordingly, the relative position of the center C2 of the crank pin 34 to the center C1 of the eccentric cam 40 is higher, as shown in FIG. 4B. In this case, since the actual position of the crankshaft 30 and the crank pin 34 is not changed, the relative position of the connecting rod 20 and the piston 10 to the crankshaft 30 may be lower than in the state shown in FIG. 4A at an upper changeover point. Accordingly, a distance between the piston pin 12 and the crank pin 34 may decrease such that the low compression ratio of the engine is realized.

That is, if the hydraulic pressure is supplied to the first chamber 52 or the second chamber 53, the cam rotation unit 50 may vary the relative position of the center C2 of the crank pin 34 to the center C1 of the eccentric cam 40.

In this case, since the actual position of the crankshaft 30 and the crank pin 34 is not changed, the relative position of the connecting rod 20 and the piston 10 to the crankshaft 30 may be lower or higher. Accordingly, the high compression ratio or the low compression ratio of the engine may be realized while the distance between the piston pin 12 and the crank pin 34 is changed.

Figure 5A:
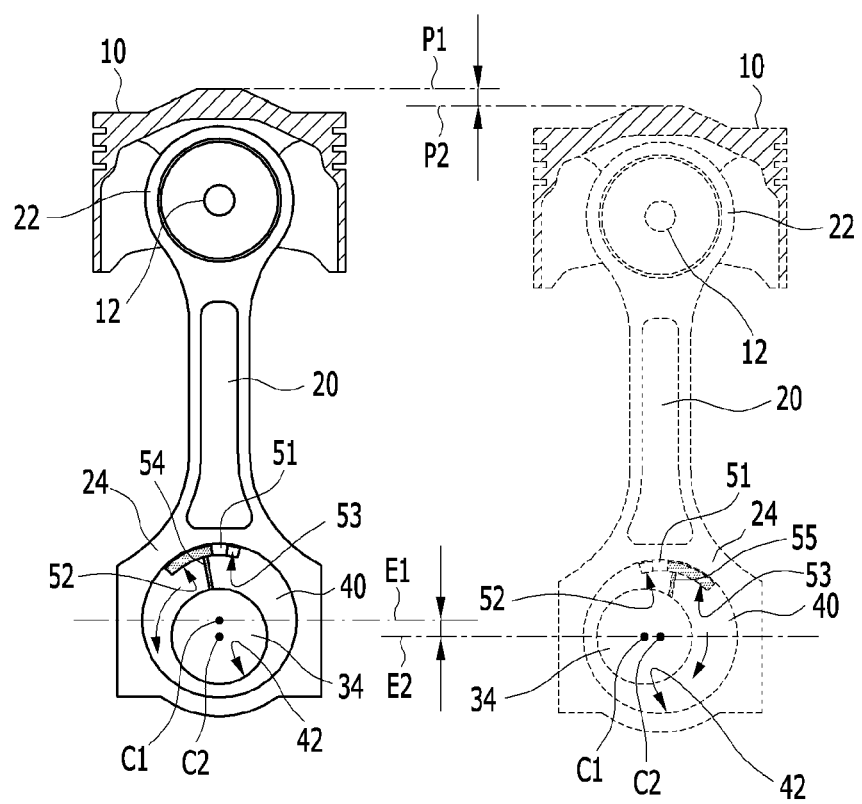
FIGS. 5A and 5B is an operation diagram of a variable compression ratio device in a high compression ratio state and a low compression ratio state according to an exemplary embodiment of the present disclosure.
Figure 5B:
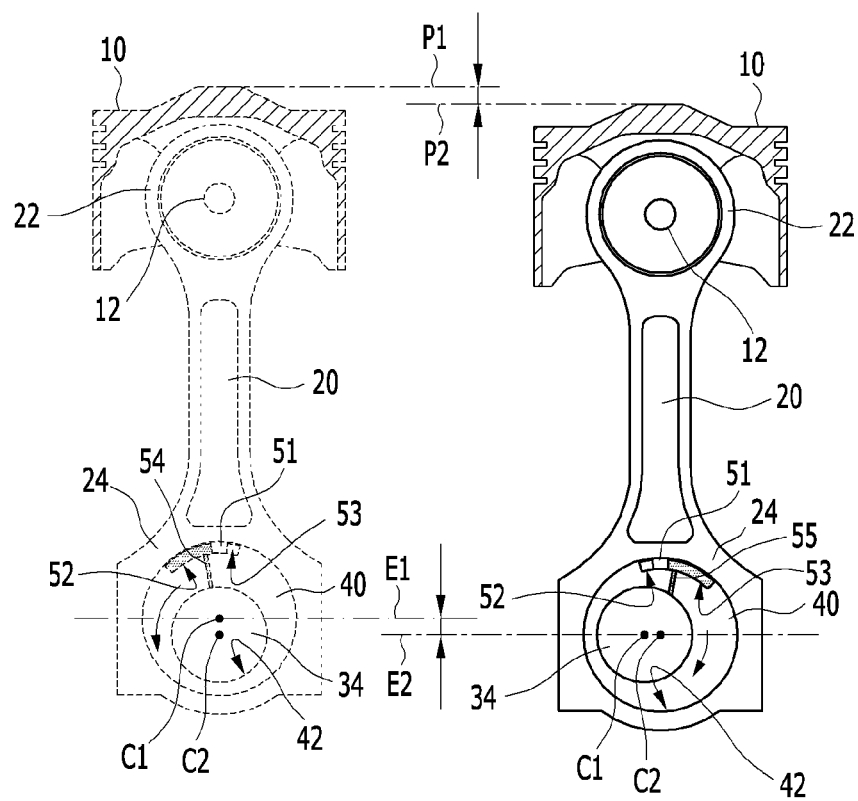

FIGS. 5A and 5B are operation diagrams of a variable compression ratio device in a high compression ratio state and a low compression ratio state, respectively, according to an exemplary embodiment of the present disclosure.

FIGS. 5A and 5B illustrate, for visual comparison of the low compression ratio and the high compression ratio of the engine, a height P1 of the piston 10 and a height E1 of the center C2 of the eccentric cam 40 in the high compression ratio state of FIG. 5A is indicated by an auxiliary line, and a height P2 of the piston 10 and a height E2 of the center C2 of the eccentric cam 40 in the low compression ratio state of FIG. 5B is indicated by the auxiliary line.

That is, referring to FIGS. 5A and 5B, the height P1 of the piston 10 in the high compression ratio state of the engine may be positioned higher than the height P2 of the piston 10 in the low compression ratio state of the engine. In this case, the height E1 of the center C1 of the eccentric cam 40 is positioned higher than the height E2 of the center C2 of the eccentric cam 40 in the low compression ratio state of the engine.

Accordingly, in the cam rotation unit 50, if the hydraulic pressure is supplied to the first chamber 52, while the eccentric cam 40 is rotated in the counterclockwise direction (FIG. 5A), the relative position of the center C2 of the crank pin 34 to the center C1 of the eccentric cam 40 is lowered. Thus, the distance between the piston pin 12 and the crank pin 34 increases.

In contrast, in the cam rotation unit 50, if the hydraulic pressure is supplied to the second chamber 53, while the eccentric cam 40 is rotated in the clockwise direction (FIG. 5B), the relative position of the center C2 of the crank pin 34 to the center C1 of the eccentric cam 40 is higher than as shown in the state of FIG. 5A. Thus, the distance between the piston pin 12 and the crank pin 34 decreases.

As described above, the variable compression ratio device 1 according to an exemplary embodiment of the present disclosure rotates the eccentric cam 40 in the clockwise or the counterclockwise by using the hydraulic pressure supplied to the cam rotation unit 50 to change the relative position of the center C2 of the crank pin 34 to the center C1 of the eccentric cam 40. Accordingly, while the distance between the piston pin 12 and the crank pin 34 is changed, the high compression ratio or the low compression ratio of the engine may be realized.

Accordingly, if the variable compression ratio device 1 according to the exemplary embodiment of the present disclosure is applied, the eccentric cam 40 is mounted on the big end portion 24 of the connecting rod 20 and the hydraulic pressure is selectively supplied to the eccentric cam 40 depending on the operation state of the engine to change the compression ratio of the air-fuel mixture, thereby improving fuel consumption.

Also, compared with the variable compression ratio device of a conventional link type, the structure is simpler, the weight is reduced, and the frictional forces according to the operation are reduced such that the durability may be improved.

Also, by using the connecting rod and the crankshaft that are applicable to the conventional engine, the variable compression ratio device may be mounted while minimizing structural changes of a conventional engine.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A variable compression ratio device mounted to an engine, the engine rotating a crankshaft using a combustion force of a gas mixture and a piston, the variable compression ratio device changing a compression ratio of the mixture and comprising:
   a connecting rod including a small end rotatably connected to the piston and a big end portion formed with a hole to be eccentrically rotatably connected to the crankshaft;
   a crank pin provided in the crankshaft;
   an eccentric cam provided to be concentrically rotatable in the hole of the big end portion and having a crank pin mounting hole eccentrically inserted with the crank pin to be rotatably connected; and
   a cam rotation unit provided inside the eccentric cam and rotating the eccentric cam in a clockwise or counter-clockwise direction in the hole of the big end portion by a selectively supplied hydraulic pressure;
   wherein the cam rotation unit includes:
   a diaphragm formed toward a center of the eccentric cam from an exterior circumference of the eccentric cam;
   a first chamber formed at one side of the diaphragm in the circumferential direction inside the eccentric cam based on the diaphragm;
   a second chamber formed at the other side of the diaphragm in the circumferential direction inside the eccentric cam based on the diaphragm;
   a first oil passage connecting the interior circumference of the crank pin mounting hole and the first chamber and selectively supplying a hydraulic pressure to the first chamber; and
   a second oil passage connecting the interior circumference of the crank pin mounting hole and the second chamber and selectively supplying the hydraulic pressure to the second chamber.

2. The variable compression ratio device of claim 1, wherein the first chamber and the second chamber are formed to be rounded in the circumferential direction of the eccentric cam at both sides of the diaphragm.

3. The variable compression ratio device of claim 1, wherein the first oil passage is formed through the eccentric cam such that one end of the first oil passage is connected to the interior circumference of the crank pin mounting hole and the other end is connected to the first chamber.

4. The variable compression ratio device of claim 1, wherein the second oil passage is formed through the eccentric cam such that one end is connected to the interior circumference of the crank pin mounting hole and the other end is connected to the second chamber, and is positioned to be separated from the first oil passage.

5. The variable compression ratio device of claim 1, wherein the eccentric cam is rotated by the hydraulic pressure that selectively inflows to the first chamber and the second chamber depending on a driving condition of the engine and, varies the relative position of the crank pin to the big end.

6. The variable compression ratio device of claim 1, wherein the eccentric cam rotates the crank pin mounting hole in the counterclockwise direction when the hydraulic pressure is supplied to the first chamber such that the relative position of the crank pin center to the eccentric cam center is lowered.

7. The variable compression ratio device of claim 1, wherein the eccentric cam rotates the crank pin mounting hole in the clockwise direction when the hydraulic pressure is supplied to the second chamber such that the relative position of the crank pin center to the eccentric cam center is higher.

8. The variable compression ratio device of claim 1, wherein the diaphragm is fixed to the interior circumference of the big end through an upper surface.

9. The variable compression ratio device of claim 1, wherein the diaphragm divides the first and second chambers to selectively supply the hydraulic pressure to the first chamber or the second chamber.

\* \* \* \* \*